No. 870,154. PATENTED NOV. 5, 1907.
J. F. BARKER.
MEASURING APPARATUS FOR GASOLENE OR OTHER OILS.
APPLICATION FILED JUNE 16, 1906.
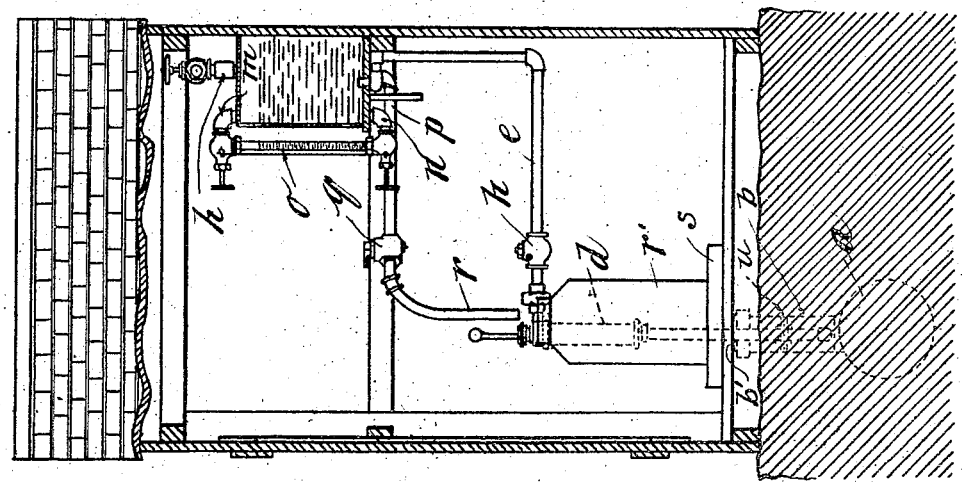
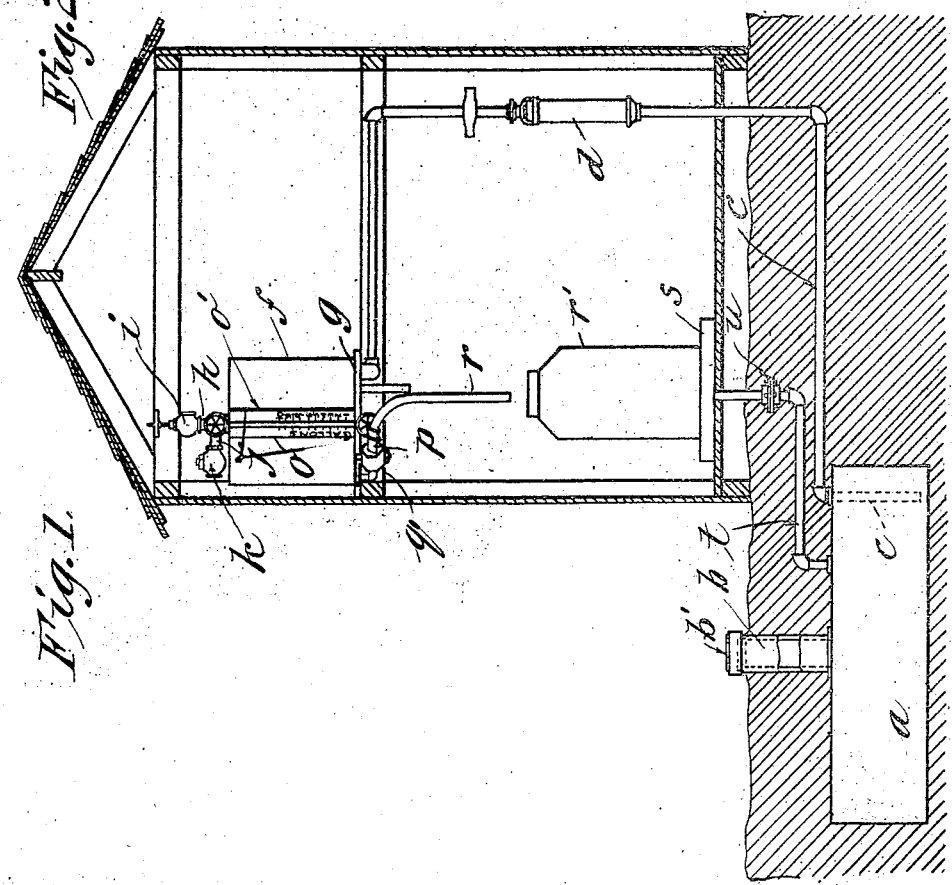
Witnesses:
Inventor:
John F. Barker
by Chapin & Co.
Attorneys.

UNITED STATES PATENT OFFICE.

JOHN F. BARKER, OF SPRINGFIELD, MASSACHUSETTS.

MEASURING APPARATUS FOR GASOLENE OR OTHER OILS.

No. 870,154.   Specification of Letters Patent.   Patented Nov. 5, 1907.

Application filed June 16, 1906. Serial No. 321,949.

*To all whom it may concern:*

Be it known that I, JOHN F. BARKER, a citizen of the United States of America, residing at Springfield, in the county of Hampden and State of Massachusetts, have invented new and useful Improvements in Measuring Apparatus for Gasolene or other Oils, of which the following is a specification.

This invention relates to a measuring apparatus for gasolene or other oils, as kerosene, and it has for its object to provide a structure by which the oil, which is, or may be, stored in large quantities underground, can be pumped into a suitable temporary tank, that is preferably located above the ground line, and drawn off in small quantities as required. The temporary storing tank is provided with a gage for showing the number of gallons of the liquid in the tank and also determining the amount that is drawn off. This temporary tank is also provided with means for allowing the air, which is placed under pressure as the same is filled, to escape, and also to avoid a vacuum in the same as the oil in the tank is withdrawn.

In the drawings forming a part of this application,—Figure 1 is a side elevation of my improved storage tank buried in the earth and the dispensing apparatus as installed in a building. Fig. 2 is an end elevation of the same.

Referring to these drawings, $a$ designates a tank or reservoir of large dimensions for holding gasolene or other inflammable material in large quantities, and buried in the earth.

$b$ designates a filling pipe for the storage tank $a$ projecting above the surface of the earth and provided with a suitable closing cap $b^1$; $c$ designates a suction pipe leading from near the bottom of the storage tank. In this pipe is connected a suitable suction and forcing hand pump $d$, although a power pump of any approved pattern may be used. Leading from the pump $d$ is a pipe $e$ connected to the bottom of the temporary storing tank $f$ at the point $g$. Located in this pipe $e$, between the tank $f$ and the pump $d$ is an ordinary check-valve $h$ allowing the liquid to be forced from the pump to the tank $f$ but preventing the liquid from running backward into the pump.

Communicating with the interior of the tank $f$ is a short pipe $h$ to which is attached a blow-off valve $i$ for the purpose of allowing the air in the upper part of the tank $f$ that is placed under compression as the tank is filled, to escape. Connected with this short pipe $h$ is a coupling piece $j$, on the end of which is supported a vacuum valve $k$ for permitting the external air to enter the tank $f$ as the gasolene is withdrawn, thus avoiding a vacuum in the upper part of the tank when the liquid is drawn off. It is understood that the vacuum valve $k$ is so arranged as to open inward, while the blow-off valve $i$ is constructed to open outward.

$m$ and $n$ indicate short pipe fittings connected to the top and bottom of the tank respectively for supporting the glass gage $o$ for indicating the level of the liquid in the tank. The fittings $m$ and $n$ are each provided with a manually operated valve to prevent either the admission of oil to the gage $o$ or the discharge of oil therefrom, as may be desired. Mounted on the tank $f$, immediately back of the glass gage $o$, is a scale $o^1$ carrying numbers for indicating the capacity of the tank in gallons at the various levels of the liquid.

$p$ designates a draw-off pipe connected to the bottom of the tank $f$ and in which is placed a shut-off valve $q$. To the outer end of the pipe $p$ is attached a short piece of hose $r$. Immediately below the hose $r$ is a drip-pan $s$ on which a can or other receptacle $r^1$ is placed while being filled. This drip-pan is permanently connected by a return-pipe $t$ back to the main supply-tank $a$. Between the drip-pan and the tank $a$ is placed a fire arrester device $u$ for preventing fire from gaining access to the tank $a$ in case the building in which the temporary storing tank is placed, is burned.

In using my measuring apparatus, the operator places the can or other receptacle $r^1$ beneath the hose $r$. The level of the liquid in the tank $f$ is noted, and when the required amount is withdrawn, (as determined by the scale $o^1$) the valve $q$ is closed.

What I claim, is:—

A liquid dispensing apparatus comprising a permanent storage tank provided with inlets and an outlet, a temporary tank having a valved outlet, a pipe permanently fitted in the outlet of the permanent tank and having unrestricted communication with the temporary tank directly through the bottom of the latter, a pump arranged in the line of said pipe intermediate the ends of the latter, a drip pan coöperating with the valved outlet, a pipe between the drip pan and one of the aforesaid inlets to return oil from the pan to the permanent storage tank independently of the first mentioned pipe and said outlet of the permanent storage tank, and a gage tube arranged adjacent the temporary tank for coöperation with the latter.

JOHN F. BARKER.

Witnesses:
H. W. BOWEN,
K. I. CLEMONS.